(12) United States Patent
Melet et al.

(10) Patent No.: US 6,615,238 B1
(45) Date of Patent: Sep. 2, 2003

(54) EVOLVING INTERACTIVE DIALOG BOX FOR AN INTERNET WEB PAGE

(75) Inventors: Stone J. Melet, San Francisco, CA (US); Todd B. Melet, Chapel Hill, NC (US)

(73) Assignee: Kettera Software, Inc., San Francisco, CA (US)

( * ) Notice: Subject to any disclaimer, the term of this patent is extended or adjusted under 35 U.S.C. 154(b) by 0 days.

(21) Appl. No.: 09/537,569

(22) Filed: Mar. 30, 2000

(51) Int. Cl.[7] ............................................... G06F 15/16
(52) U.S. Cl. ...................... 709/203; 709/200; 709/217; 709/219; 707/10; 715/501.1; 715/513
(58) Field of Search ................................. 709/200–203, 709/206–207, 217–219, 227–229; 707/10; 715/501.1, 513

(56) References Cited

U.S. PATENT DOCUMENTS

| | | | | |
|---|---|---|---|---|
| 5,778,368 A | * | 7/1998 | Hogan et al. | 709/203 |
| 5,802,299 A | * | 9/1998 | Logan et al. | 709/218 |
| 5,948,054 A | * | 9/1999 | Nielsen | 709/200 |
| 6,029,141 A | | 2/2000 | Bezos et al. | 705/27 |
| 6,167,426 A | * | 12/2000 | Payne et al. | 709/200 |
| 6,285,998 B1 | | 9/2001 | Black et al. | |
| 6,307,573 B1 | | 10/2001 | Barros | |
| 6,332,150 B1 | | 12/2001 | Khan et al. | |
| 6,493,733 B1 | * | 12/2002 | Pollack et al. | 715/513 |

* cited by examiner

*Primary Examiner*—Bharat Barot
(74) *Attorney, Agent, or Firm*—McKenna Long & Aldridge LLP

(57) ABSTRACT

A host Web page includes a evolving interactive dialog box wherein an Internet user may enter user data to be processed. When the user completes entering data in a first revolution of the interactive dialog box, the first revolution is replaced with a second revolution of the evolving interactive dialog box without disturbing or affecting any other part of the host Web page being displayed. Thus, the user is not driven or distracted away from the host Web site while providing data to be processed. The evolving interactive dialog box is especially well-suited to operation with an interrogation processing system which receives questions from users via the Internet and forwards the questions, preferably via the Internet, to sponsors selected based on information pertaining to the question.

19 Claims, 7 Drawing Sheets

Sponsored Web Results

Lawn Mower
Buy Lawnmowers, Edgers, Weeders & More - Shop Sears & Save!
From: www.Sears.com

Lawn Mower
Find the best deal! Compare prices on all products from across the web
From: www.mysimon.com

Buy Lawn Mowers on Sale
Free shipping! Huge selection. Easy online ordering. Amazon affiliate.
From: www.amazon.com

Mower on eBay.
Low Prices. - Millions of Items. Buy or Sell on eBay Here!
From: www.ebay.com

Blade Lawn Mower
Compare Prices at over 2,000 Stores Find the best deals at BizRate.com!
From: www.BizRate.com

EVOLVING INTERACTIVE DIALOG BOX FOR AN INTERNET WEB PAGE

BACKGROUND OF THE INVENTION

1. Field of the Invention

This invention pertains to the field of the Internet and, more specifically, to a system and method for communicating information over the Internet.

2. Description of the Related Art

To facilitate understanding of the background and preferred embodiments of the invention, the following terms and acronyms are used through this specification:

Client-Server. A model of interaction in a distributed computer system in which a program at one site sends a request to a program at another site and waits for a response. The requesting program is called the "client," and the program which responds to the request is called the "server." In the context of the World Wide Web (discussed below), the client is a "Web browser" (or simply "browser") which runs on a computer of a user; the program which responds to browser requests by serving Web pages is commonly referred to as a "Web server."

Dialog Box. A window or box that appears on a display screen to present information and request user input or user data.

Hyperlink. A navigational link from one document to another, or from one portion (or component) of a document to another. Typically, a hyperlink is displayed as a highlighted word or phrase that can be selected by clicking on it using a mouse to jump to the associated document or documented portion.

Hypertext System. A computer-based informational system in which documents (and possibly other types of data entities) are linked together via hyperlinks to form a user-navigable "Web."

Internet. A collection of interconnected (public and/or private) networks that are linked together by a set of standard protocols(such as TCP/IP and HTTP) to form a global, distributed network. (While this term is intended to refer to what is now commonly known as the Internet, it is also intended to encompass variations which may be made in the future, including changes and additions to existing standard protocols.)

World Wide Web ("Web"). Used herein to refer generally to both (i) a distributed collection of interlinked, user-viewable hypertext documents (commonly referred to as Web documents or Web pages) that are accessible via the Internet, and (ii) the client and server software components which provide user access to such documents using standardized Internet protocols. Currently, the primary standard protocol for allowing applications to locate and acquire Web documents is HTTP, and the Web pages are encoded using HTML. However, the terms "Web" and "World Wide Web" are intended to encompass future markup languages and transport protocols which may be used in place of (or in addition to) HTML and HTTP.

Web Site. A computer system that serves informational content over a network using the standard protocols of the World Wide Web. Typically, a Web site corresponds to a particular Internet domain name, such as "ASKFORFREE.COM®," and includes the content associated with a particular organization. As used herein, the term is generally intended to encompass both (i) the hardware/software server components that serve the informational content over the network, and (ii) the "back end" hardware/software components, including any non-standard or specialized components, that interact with the server components to perform services for Web site users.

HTML (HyperText Markup Language). A standard coding convention and set of codes for attaching presentation and linking attributes to informational content within documents. (HTML 2.0 is currently the primary standard used for generating Web documents.) During a document authoring stage, the HTML codes (referred to as "tags") are embedded within the informational content of the document. When the Web document (or HTML document) is subsequently transferred from a Web server to a browser, the codes are interpreted by the browser and used to parse and display the document. Additionally in specifying how the Web browser is to display the document, HTML tags can be used to create links to other Web documents (commonly referred to as "hyperlinks"). For more information on HTML, see Ian S. Graham, The HTML Source Book, John Wiley and Sons, Inc., 1995 (ISBN 0471-11894-4).

HTTP (HyperText Transport Protocol). The standard World Wide Web client-server protocol used for the exchange of information (such as HTML documents, and client requests for such documents) between a browser and a Web server. HTTP includes a number of different types of messages which can be sent from the client to the server to request different types of server actions. For example, a "GET" message, which has the format GET , causes the server to return the document or file located at the specified URL (see below).

URL (Uniform Resource Locator). A unique address which fully specifies the location of a file or other resource on the Internet. The general format of a URL is protocol://machine address:port/path/filename. The port specification is optional, and if none is entered by the user, the browser defaults to the standard port for whatever service is specified as the protocol. For example, if HTTP is specified as the protocol, the browser will use the HTTP default port of 80.

The Internet allows users access to a tremendous amount of information and also provides the ability to conduct remote transactions (e.g., E-commerce) via their computers. However, there is a constant challenge to more easily allow users to locate and obtain specific information of interest to them and to conduct electronic transactions.

As is well known, Internet Web pages often include embedded hyperlinks to uniform resource locators (URLs) for other Internet Web pages. When an Internet user viewing a particular Web page "clicks on" or selects a hyperlink, the user's Web browser is directed away from the Web page that the user is currently viewing, and a linked-to Web page is loaded into the Web browser. Accordingly, one technique for an Internet user to locate and obtain information of interest is to navigate from Web page to Web page by clicking embedded hyperlinks.

However, simple navigation from Web page to Web page is typically a very inefficient way for an Internet user to locate and obtain information of interest. Therefore, tools have been developed to facilitate the process.

One tool to help Internet users locate and obtain information of interest is an Internet search engine. An Internet user may access an Internet search engine through a Web site hosting the Internet search engine (e.g., www.yahoo.com). Alternatively, a hyperlink to the Internet search engine may be embedded within any other Web page, (e.g., www.netscape.com). Typically, an Internet search engine includes a search terms entry box into which an Internet user types search terms or keywords via his or her computer. The Web site hosting the Internet search engine then transmits a new Web page to be displayed by a user's computer display screen containing the results of the Internet search, which it is hoped will assist the user to find the information of interest.

However, there are several problems in these conventional methods of accessing information via the Internet.

One problem is that when a user clicks on a hyperlink, or enters data into a search terms entry box of a host Web page which the user is viewing, the user's view of the host Web page is altered. Typically, the user's Web browser is pointed away from the host Web page which the user is viewing, and a new, linked-to, Web page is loaded into the user's Web browser in place of the host Web page. Alternatively, the user's computer may open a second Web browser window containing the linked-to Web page, covering the host Web page on the user's computer display screen. Or, in some cases, a "pop-up box" opens on the user's computer display screen, covering all or part of the host Web page.

In many cases, the provider of the host Web page does not want to have its host Web page disappear or be covered on the user's computer display screen, or even to have the user's attention turned away from the host Web page. This may be the case where the host Web page includes paid advertisement banners and/or paid-for embedded links to other Web pages, such that the provider of the host Web page may lose revenue if the user leaves the host Web page or the host's Web site.

The above-mentioned problem also applies to a Web page which contains an embedded hyperlink to allow an Internet user to perform a transaction. An example of such a process is described in U.S. Pat. No. 6,029,141. In the process described in U.S. Pat. No. 6,029,141, it is disclosed that Web pages of "associate" Web sites:

"include product-specific hyperlinks, referred to herein as 'referral links' that allow potential customers to link to the merchant's Web site to initiate purchases of such products from the merchant."

Accordingly, in these conventional systems, when a user wants to execute a transaction, the user's Web browser is pointed away from the host Web page which the user is viewing, and a new Web page is loaded in its place into the user's Web browser so that the user may enter user data to complete the transaction.

Another problem is that it is often difficult to get answers to specific "plain language" questions via the Internet. Typically, Internet search engines try to locate Web pages containing specific terms entered into a search terms entry box by an Internet user. The Internet search engine may not distinguish between the various forms of interrogatory posed by the user, e.g., the differences between "when," "where," and "who" for example. Also, the Internet search engine typically attempts to satisfy the user's inquiry by providing the user with a list of hyperlinks to other Web pages where, it is hoped, the answer to the user's question can be found.

Some Web tools have been developed to help answer specific "plain language" questions. One example can be found at www.askjeeves.com.

For example, FIG. 1 shows an actual "plain language" question entered into a dialog box of a banner provided on a Web page by www.askjeeves.com. The banner of FIG. 1 may be embedded within any Web page for any Internet site. The banner comprises an inquiry dialog box which provides information to a user and also provides a data entry box (e.g., a question box) wherein a user may submit user data (e.g., a question). FIG. 2 shows the Web page loaded into the user's Web browser when the question shown in FIG. 1 is transmitted to the ASKJEEVES.COM® Web site.

However, as can be seen, these tools suffer from similar problems to those of the Internet search engines. First, the user's Web browser is pointed away from the host Web page which the user was viewing when he or she first asked the question, and a new Web page associated with www.askjeeves.com is loaded instead into the user's Web browser. Second, in the example shown, the Web page provided in response to the user's question doesn't answer the user's very simple question at all. Instead, it merely contains hyperlinks to other Web pages which seem to have something, generally, to do with the subject matter of the question. Moreover, in this example, there are Web pages available from the Internet which contain a very specific answer to the user's question, e.g., http://www.homearts.com/pm/diybuzz/071awnb5.htm, shown in FIG. 3, and http://www.aboutliving.com/Apr. 12, 1999/balancedmoney—LawnMowerTuneUpMadeEasy.html. But the user is not provided with these answers by this process and must continue his or her search.

Also, it is not practical with current technology for a single automated Web page tool to give an automated response to "plain language" questions covering the vast variety of subjects for which users may have inquiries.

Yet another problem is that the specific information which the Internet user is seeking may not even be available from any Web page or any information stored on a Web site. In that case, the conventional tools and methods of locating and obtaining information of interest via the Internet will necessarily be ineffective.

Accordingly, it would be advantageous to provide a method and system of receiving user data, such as a "plain language" question, from an Internet user via a host Web page without driving the Internet user away from the host Web page. It would also be advantageous to provide a method and system of processing "plain language" questions received from a user computer via the Internet. Other and further objects and advantages will appear hereinafter.

SUMMARY OF THE INVENTION

The present invention comprises a method and system for processing user data, such as interrogatories, received from a user computer via the Internet.

In one aspect of the invention, a host Web page includes an evolving interactive dialog box wherein an Internet user may enter user data, such as a question, to be processed. After the user enters data into a user data entry box of a first revolution of the evolving interactive dialog box, the first revolution is replaced with a second revolution without disturbing or affecting any other part of the host Web page being displayed by the user's computer. Thus, the user is not driven or distracted away from the host Web site while submitting user data via the Internet to be processed.

In a further aspect of the invention, a method of processing user data comprises communicating across the Internet to a user computer a host Web page including a banner comprising a first dialog box, displaying the host Web page at the user computer, entering first user data into the first dialog box, indicating that the first user data has been completely entered into the first dialog box, and replacing the first dialog box with a second dialog box while display of a remainder of the host Web page on the user computer is not changed.

In another aspect of the invention, a method of processing a question, comprises communicating across the Internet a host Web page including a banner comprising a first dialog box to a user computer, displaying the Web page at the user computer, entering the question into the first dialog box, replacing the first dialog box with a second dialog box while display of a remainder of the host Web page by the user computer is not changed, entering into the second dialog box a destination for receiving an answer to the question, communicating the question and the destination across the Internet to an interrogation processing system, and replacing the second dialog box with a third dialog box.

In yet another aspect of the invention, a method of communicating user data from a user computer to a selected sponsor comprises providing to the user computer a Web page including a data entry box for receiving the user data, entering the user data into the data entry box on the Web page, communicating the user data across the Internet from the user computer to an information processing system, determining the selected sponsor based at least in part upon the user data, and forwarding the user data from the information processing system to the selected sponsor, particularly via the Internet.

In still another aspect of the invention, a computer-implemented system for processing a question comprises a user computer displaying a Web page which includes a dialog box for entering the question, an interrogation processing system, and a plurality of sponsor Web sites each associated with one or more categories of questions, wherein the interrogation processing system receives the question from the user computer and forwards the question, particularly via the Internet, to one of the plurality of sponsors which is selected at least in part based upon an attribute of the question.

BRIEF DESCRIPTION OF THE DRAWINGS

Figure 1:
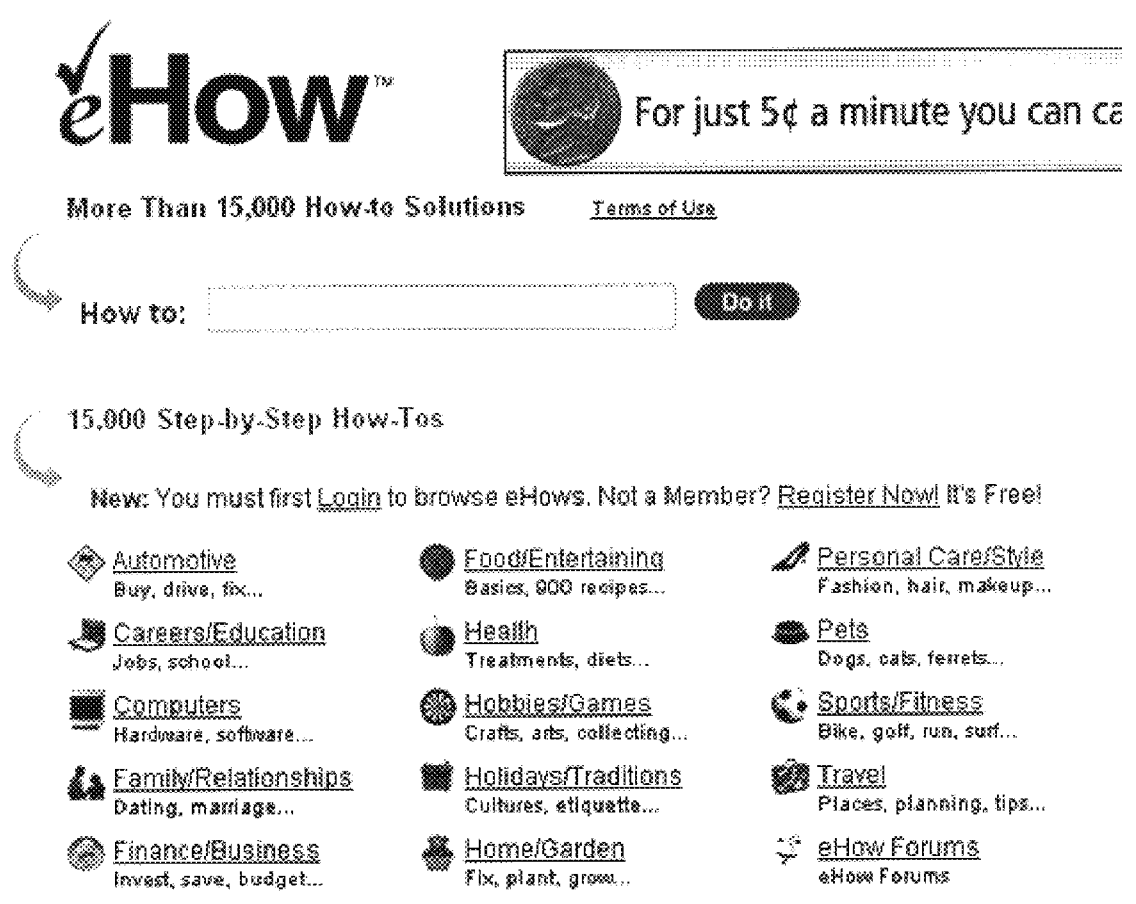

FIG. 1 shows an actual "plain language" question entered into an inquiry dialog box of a prior art Internet-based interrogation processing system;

FIG. 2 shows a Web page loaded into the user's Web browser when the question shown in FIG. 1 is transmitted to a conventional Web site;

DESCRIPTION OF THE PREFERRED EMBODIMENTS

Figure 3:
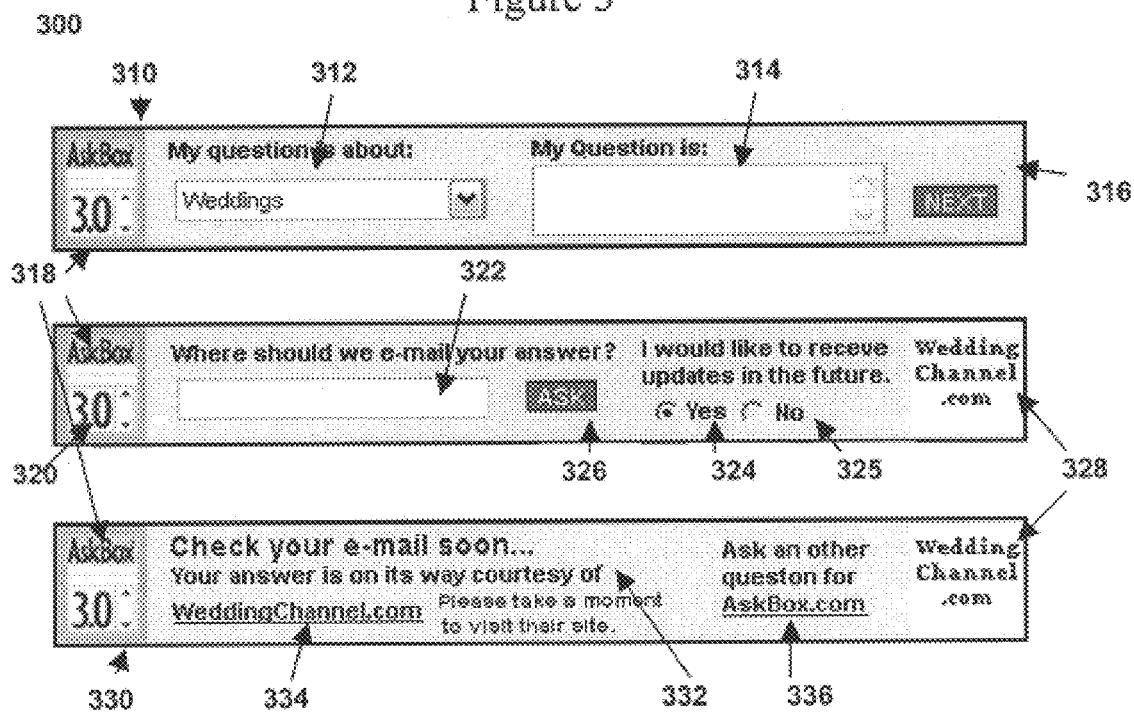
FIG. 3 shows a preferred embodiment of an evolving interactive dialog box for a Web page.

FIG. 3 shows a preferred embodiment of an evolving interactive dialog box 300 for a Web page. In the embodiment shown in FIG. 3, the evolving interactive dialog box 300 has three evolutionary states, each herein referred to as a "revolution." Each revolution may comprise a banner having a dialog box. More specifically, the three revolutions of the evolving interactive dialog box 300 may be a first banner having a first dialog box, a second banner having a second dialog box, and a third banner having a third dialog box.

The first revolution 310 preferably includes a category menu 312, a data entry box 314, a "Next" button 316, and a provider logo 318. The second revolution 320 preferably includes a destination entry box 322, Opt-in/Opt-out buttons 324/325, an "Ask" button 326, the provider logo 318, and a sponsor logo 328. The third revolution 330 preferably includes a message area 332, a sponsor hyperlink 334, a "Return" button 336, the provider logo 318, and the sponsor logo 328.

Figure 4:
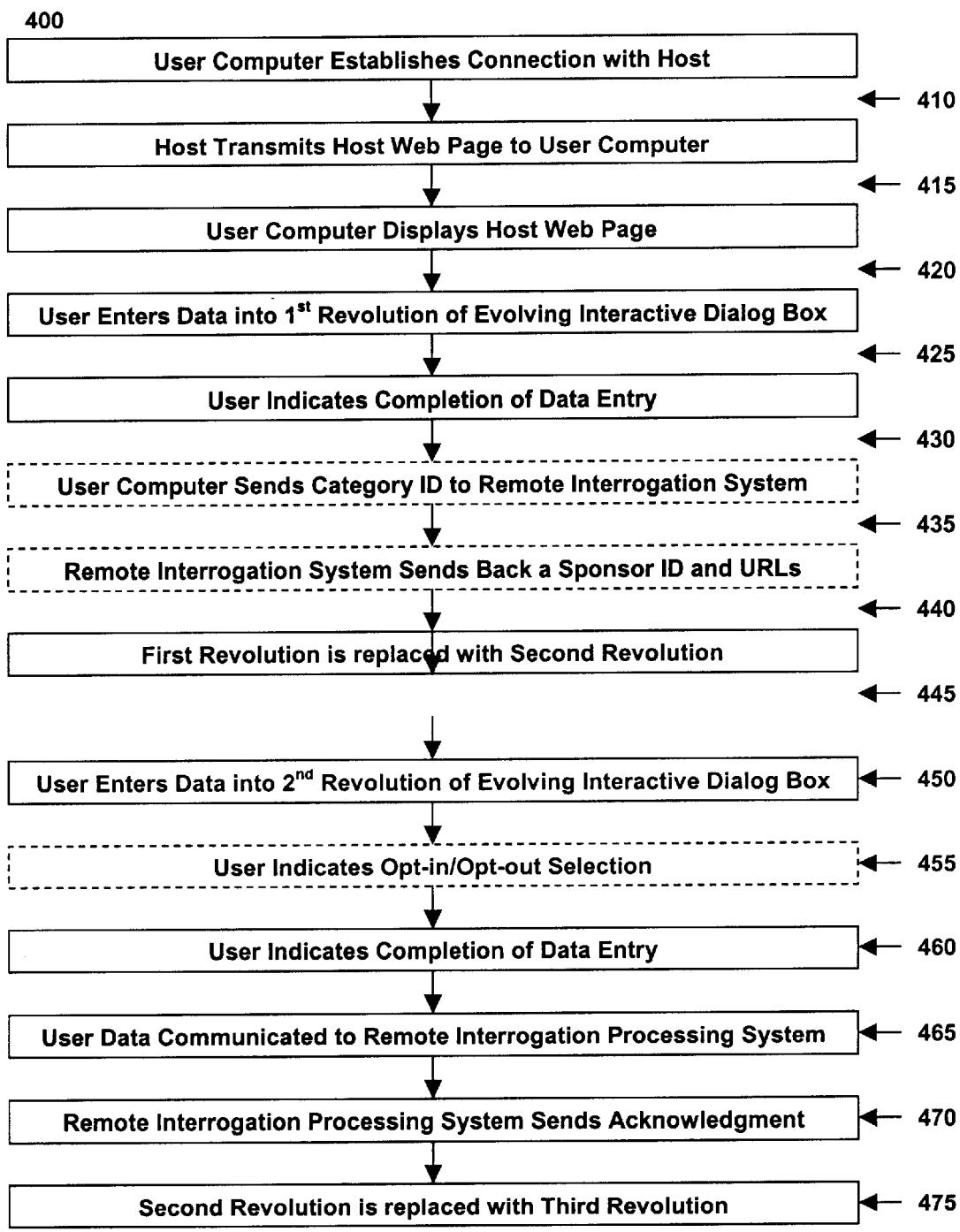
FIG. 4 is a flowchart of a preferred embodiment process for receiving a question submitted by an Internet user via an evolving interactive dialog box.

An exemplary operation of the evolving interactive dialog box 300 will be explained with respect to the flowchart of FIG. 4, illustrating a preferred embodiment of a process 400 for receiving a question submitted by an Internet user via an evolving interactive dialog box.

Figure 5:
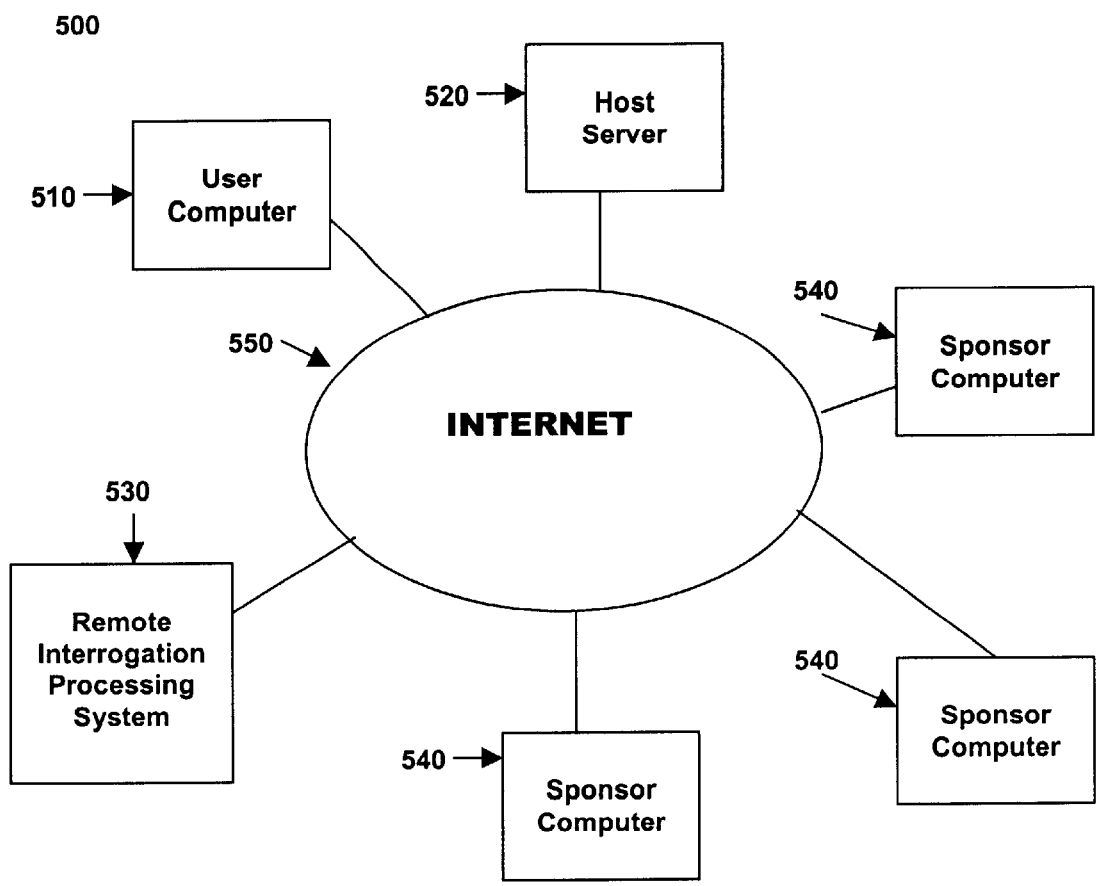
FIG. 5 shows a block diagram of an exemplary computer-implemented system for processing a question received from a user computer shown.

The process 400 may be better understood with reference to the block diagram of FIG. 5 illustrating an exemplary system 500 for processing a question received from a user computer. The system 500 comprises a user computer 510, a host server 520 for providing a host Web page, a remote interrogation processing system 530, and one or more sponsor computers 540 all connected via the Internet 550. The remote interrogation processing system 530 preferably includes: at least one server computer for hosting a Web site for receiving and transmitting information via the Internet; at least one question database for storing information pertaining to questions submitted and for tracking their status; and a second database for storing information pertaining to sponsors associated with the sponsor computers 540.

In a first step 410, a user computer establishes an Internet connection with a host Web site, which may be provided by the host server 520, and requests transmission of a host Web page which includes an evolving interactive dialog box, such as the evolving interactive dialog box 300.

In a second step 415, the host Web site transmits the host Web page across the Internet to the user computer for display on a display screen by a Web browser resident on the user computer.

In a preferred embodiment, the host Web page includes an embedded URL for a Web site where a routine is located, such as a JAVA® Applet, to be executed by the Web browser. Preferably, the routine or JAVA® Applet may be found at a Web site server of the remote interrogation processing system 530. When the host Web page is loaded into the user computer's Web browser, the Web browser establishes an Internet connection with a server at the specified URL address where the JAVA® Applet or other executable routine is located, and downloads the JAVA® Applet or other executable routine into the Web browser. The Web browser then executes the JAVA® Applet or other executable routine to create and operate the evolving interactive dialog box within the host Web page. A more detailed description of an exemplary JAVA® Applet will be provided below with respect to FIG. 6.

In a next step 420, the Web browser of the user computer displays the host Web page. The host Web page displays in a predetermined location a first revolution of the evolving interactive dialog box, such as the first revolution 310 of FIG. 3.

In a next step 425, a user enters user data into a data entry box in the first revolution of the evolving interactive dialog box.

In the preferred embodiment wherein the evolving interactive dialog box is used in a method and system for processing a question received from an Internet user, the data entry box is a question box and the user data comprises a user's question.

Preferably the first revolution also includes a category menu such as the category menu 312. The category menu may be a pull-down menu listing categories to which a question may pertain. For example, categories may include such diverse topics as Romance and Real Estate.

Table 1 below lists some exemplary categories, however the list is not inclusive and many other categories are possible. The categories displayed to the user in the pull-down menu may be a subset of a larger set of categories available from the remote interrogation processing system 530. In that case, the subset of categories presented to the user may be selected by a provider of the host Web page and the evolving interactive dialog box may obtain the selected subset according to a URL or hostID value embedded in the host Web page. Also, the categories menu may include text having an embedded hyperlink to a Web page for the remote interrogation processing system 530. Further details regarding categories will be explained below with respect to FIG. 7.

TABLE 1

Apartment Hunting
Bags
Beauty
Credit Card Rates
Credit Reports
Death Planning
Flowers
Greeting Cards
Hobbies
Home Energy Rates
Home Improvements
Insurance Quotes
Internet & DSL Service
Language Translation
Legal
Long Distance Rates
Medical
Mortgages
Moving/Relocating
Real Estate
Romance
Satellite TV
Sporting Goods
Technical Support
Telemarketing
Volunteerism
Weddings/Engagements
Wine In a next step 430, the user indicates that the user data has been completely entered into the data entry box of the first revolution. Preferably, the user makes this indication by clicking on a button of the evolving interactive dialog box, such as the "Next" button 316 shown in FIG. 3.

In an optional next step 435, a category ID for the category selected by the Internet user is communicated by a routine such as a JAVA® Applet via the Internet to the remote interrogation processing system 530. In that case, in a subsequent step 440, the remote interrogation processing system 530 communicates back across the Internet to the JAVA® Applet or other executable routine executing on the user computer 510 a sponsor ID corresponding to a sponsor of the selected category, a URL for a Web page available from a corresponding sponsor computer 540, and a URL where a sponsor logo may be found via the Internet.

In a subsequent step 445, the first revolution of the evolving interactive dialog box is replaced in place in the host Web page with a second revolution such as the second revolution 320 of FIG. 3.

Advantageously, display of the remainder of the host Web page on the user computer is not affected by the revolution of the evolving interactive dialog box. The user's Web browser is not pointed away from the host Web page which the user is viewing, nor does a second Web browser window, or a "pop-up box," open on the user's computer display screen. Thus, the user is able to interact with the evolving interactive dialog box without having the user's view of the remainder of the host Web page altered in any way. When the user is executing a process involving the evolving interactive dialog box, the user's Web browser remains loaded with the host Web page at all times.

In the preferred embodiment wherein the evolving interactive dialog box is used in a method and system for processing a question received from an Internet user, the second revolution may be the second revolution 320 of FIG. 3. In that case, the second revolution includes the destination entry box 322, an opt-out button 324, an "Ask" button 326, the provider logo 318, and the sponsor logo 328, which may be the sponsor logo received from the interrogation processing system in the step 440.

In a next step 450, the Internet user enters user data into a data entry box in the second revolution of the evolving interactive dialog box. In the preferred embodiment wherein the evolving interactive dialog box is used in a method and system for processing a question received from an Internet user, the Internet user enters a destination where the user desires to receive a reply to his or her question into a data entry box.

In a first embodiment, the destination is an e-mail address for the Internet user where a reply to his or her question should be sent.

In a further embodiment, the second revolution may include a reply method pull-down menu listing various acceptable optional methods by which the Internet user may receive a reply. For example, options may include e-mail message, facsimile, "snail mail," telephone, Fed Ex, instant chat, overnight mail, interactive video, interactive audio, or other similar methods. In that case, the Internet user selects a desired reply method from the pull-down menu and enters an appropriate destination (e.g., e-mail address; facsimile number; postal address; etc.) into the data entry box.

In an optional next step 455, the user indicates whether they would like to receive updated information in the future at the destination entered in the step 450, preferably by clicking an Opt-in or Opt-out button in the second revolution. If the user indicates that he or she would like to receive updated information in the future, then the user has "opted-in." If the user indicates that he or she would not like to receive updated information in the future, then the user has "opted-out." Further details regarding the significance of the Opt-in/Opt-out designations will be discussed below with respect to FIG. 7.

In a next step 460, the Internet user indicates that the user data has been completely entered into the data entry box of the second revolution, and any other selections (e.g., Opt-in/Opt-out; reply method; etc.) have been made. Preferably, the user makes this indication by clicking on a button of the evolving interactive dialog box, such as the "Ask" button 326 shown in FIG. 3.

In an optional next step 465, when the evolving interactive dialog box is used in a method and system for processing a question received from an Internet user, the user data entered in the data entry box of the first revolution, the user data entered in the data entry box of the second revolution, and any other selections made by the user are communicated by a routine or JAVA® Applet executing within a Web browser of the user computer while the browser views the host Web page, via the Internet to the remote interrogation processing system 530. In that case, in a step 470, the remote interrogation processing system 530 communicates an acknowledgment back to the user computer to be processed by the JAVA® Applet or other executable routine executing within the Web browser of the user computer.

In a final step 475, the second revolution of the evolving interactive dialog box is replaced in place in the host Web page with a third revolution such as the third revolution 330 of FIG. 3. Preferably, the third revolution 330 includes an acknowledgment of the user data entered in that first and/or second revolutions. The third revolution may also include an embedded hyperlink to a sponsor's Web page hosted on a sponsor computer 540*a*, a "Return" button, a sponsor logo, and a "Return" button to allow the Internet user to return to the first revolution and enter additional user data, such as an additional question.

Advantageously, display of the remainder of the host Web page on the user computer is not affected by the replacement of the second revolution of the evolving interactive dialog box with the third revolution. The process of replacing the second revolution with the third revolution is the same as discussed above with respect to replacing the first revolution with the second revolution. That is, the user's Web browser is not pointed away from the host Web page which the user is viewing, nor does a second Web browser window, or a "pop-up box," open on the user's computer display screen. Thus, the user is able to interact with the evolving interactive dialog box without having the user's view of the remainder of the host Web page altered in any way.

The above description of an operation of the evolving interactive dialog box applies specifically to a method and system for processing a question received from an Internet user. However, many other variations and uses of the evolving interactive dialog box are possible. Also, the evolving interactive dialog box may include a keyword search box in place of or in addition to the category menu and data entry box.

An evolving interactive dialog box in general may be used with any information processing system. For example, in an alternative preferred embodiment, the evolving interactive dialog box may be used in a method and system of conducting an electronic commerce transaction. In that case, the first revolution may comprise an electronic order form for conducting an on-line electronic purchase transaction. For example, the first revolution may include a pull-down product menu of goods which a user may order through the evolving interactive dialog box. The first revolution may also include a data entry box wherein a user may enter a quantity or price of goods to be ordered. Preferably, the order form may support secure, encrypted transactions. Through the evolving interactive dialog box, user data may be communicated to a remote information processing system.

Also, although the evolving interactive dialog box 300 shown in FIG. 3 has three revolutions, in general an evolving interactive dialog box may have N revolutions, where N>2.

Figure 6:
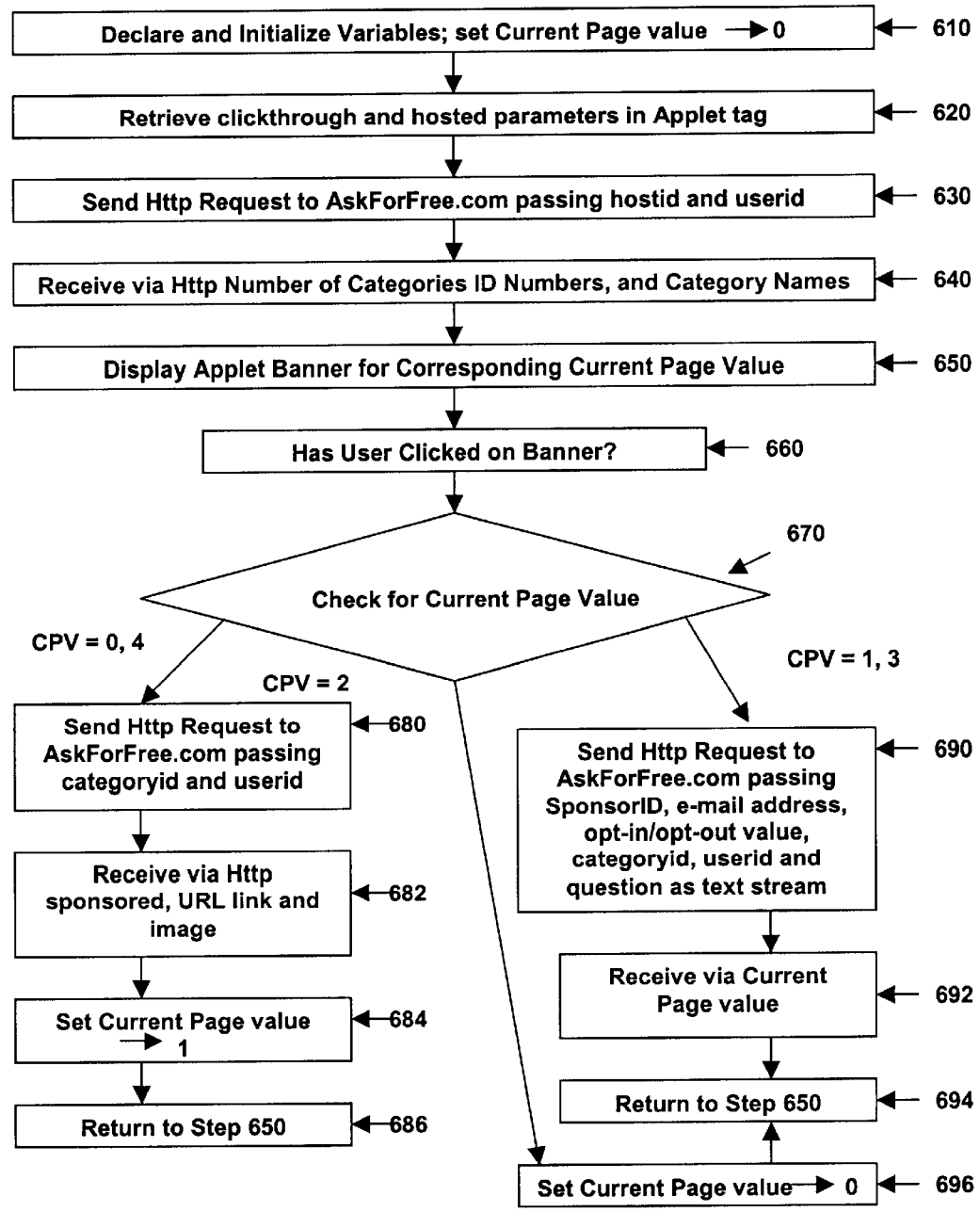
FIG. 6 is a flow chart of a computer software routine for creating and administering an evolving interactive dialog box in a Web page.

FIG. 6 is a flow chart 600 of a preferred embodiment of computer software routine for creating and administering an evolving interactive dialog box in a Web page, for example, for receiving a user question. Preferably, the computer software routine is implemented using the JAVA® programming language as a JAVA® Applet as will described below. Also, preferably, the Applet is downloaded to a user computer from a remote interrogation processing system via the Internet during a process for receiving a question submitted by an Internet user via an evolving interactive dialog box.

In a first step 610, the routine declares and initializes all variables. When the Applet is first downloaded, the remote interrogation processing system transmits a unique userID which will be used by the remote interrogation processing system to track all data for a particular Internet user's question(s). Also, the Applet initializes a CurrentPage variable which identifies a current revolution which is to be displayed by the Applet.

In a preferred embodiment, the CurrentPage variable may have values of 0, 1, 2, 3 or 4 depending upon the state of the evolving interactive dialog box to be displayed. Preferably: a CurrentPage value of 0 indicates a first revolution, having a category menu and a question box; a CurrentPage variable of 1 indicates a second revolution, having a destination entry box and opt-in/opt-out buttons; a CurrentPage value of 2 indicates a third revolution, including an acknowledgment of the user data entered in that first and/or second revolutions; a CurrentPage value of 3 indicates a modified second revolution, having the destination entry box and the opt-in/opt-out buttons and a message instructing the user to enter a new destination address; and a CurrentPage value of 4 indicates a modified first revolution, having the category menu and a question box and a message instructing the user to enter a new question. Initially, the CurrentPage variable is set equal to 0, indicating that the first revolution of the evolving interactive dialog box is to be displayed initially.

In a next step 620, the Applet retrieves the clickthrough and hostID parameters specified in the html of the <applet> tag of the host Web page. The hostID value identifies a host from whose host Web page the user is submitting the question.

The clickthrough parameter identifies whether or not the Applet should operate as an evolving interactive dialog box, or, optionally, whether it should operate as a normal banner dialog box. When the clickthrough parameter indicates that a normal banner dialog box is to be used, then when a user clicks in the banner area, the user's Web browser is pointed away from the host Web page which the user is viewing, and a new, linked-to, Web page is loaded into the user's Web browser in place of the host Web page. The user then completes his or her inquiry via the newly loaded Web page, as in the conventional art.

However, when the clickthrough parameter identifies that the Applet should operate as an evolving interactive dialog box, then the flowchart 600 is followed.

In that case, in a step 630, the Applet sends an Http request via the Internet to a Web site for the remote interrogation processing system, passing the userID and hostID parameters.

In a following step 640, the Applet receives via the Internet the number of categories to be displayed, and categoryIDs and category names for each category to be displayed.

Preferably, the categories displayed to the user in the pull-down menu may be a subset of a larger set of categories available from the remote interrogation processing system. In that case, the subset of categories presented to the user may be selected by a provider of the host Web page and the evolving interactive dialog box obtains the selected subset in the step 640.

In a next step 650, the Applet displays an Applet banner corresponding to the current revolution of the evolving interactive dialog box. As described above, in a preferred embodiment, the CurrentPage variable may have five values and the Applet banner may be displayed differently for each of these five values.

In a subsequent step 660, the Applet checks for user interaction with the Applet banner. For example, when the user pulls down the category menu, then the Applet displays the list of categories available.

In the step 660, the Applet also determines whether the user has clicked on a button indicating that a next revolution of the evolving interactive dialog box should be displayed.

In that case, in a step 670, the Applet checks for the value of the CurrentPage variable.

If the CurrentPage value is 0 or 4, then the Applet proceeds to the step 680. A CurrentPage value of 0 indicates that the first revolution is being displayed, and that the user has completed selecting a category and entering his or her question in the dialog box. As will be described below with respect to step 690, the question subsequently will be transmitted to the remote interrogation processing system and checked, for example, for profane language. If the question is not acceptable, then the remote interrogation processing system will transmit back to the Applet a CurrentPage value of 4, indicating that the first revolution should be displayed again to the user including a message instructing the user to enter a new question.

In the step 680, the Applet sends an Http request via the Internet to a Web site for the remote interrogation processing system, passing the hostID parameter and a categoryID corresponding to the category selected by the user.

In a next step 682, the Applet receives via the Internet a sponsorID value corresponding to the categoryID for the category selected by the user, together with a URL link and an image corresponding to the sponsor to be used in a subsequent second revolution.

In a next step 684, the Applet sets the value of the CurrentPage variable equal to 1, indicating that the second revolution should be displayed. Then, in a step 686, the Applet returns to the step 650, displays an Applet banner for the revolution corresponding to the CurrentPage value, and the process continues.

If the CurrentPage value is 1 or 3 in the step 670, then the Applet proceeds to the step 690. A CurrentPage value of 1 indicates that the second revolution is being displayed, and that the user has completed entering his or her destination (e.g., e-mail) address and has made an opt-in/opt-out selection. In that case, in the step 690, the Applet sends an Http request via the Internet to a remote interrogation processing system, passing a categoryID value, a userID value, a sponsorID value, an opt-in/opt-out value, an e-mail address, and a question (preferably as a text stream) from data entered by the use in the first and second revolutions of the evolving interactive dialog box.

The question is then checked at the remote interrogation processing system, for example, for profane language. If the question is not acceptable, then the remote interrogation processing system will transmit back to the Applet a CurrentPage value of 4, indicating that the first revolution should be displayed again to the user, modified to include a message instructing the user to enter a new question.

The destination address is also checked at the remote interrogation processing system. For example, if the destination address is an e-mail address, the e-mail address is checked for an invalid domain name. If the e-mail address is determined to be invalid, then the remote interrogation processing system will transmit back to the Applet a CurrentPage value of 3, indicating that the second revolution should be displayed again to the user, modified to include a message instructing the user to enter a new destination.

If the question and the destination address are acceptable to the remote interrogation processing system, then the remote interrogation processing system will transmit back to the Applet a CurrentPage value of 3, indicating that the third revolution should be displayed confirming to the user that the question has been received and that an answer will be sent within a specified time period.

In a next step 692, the Applet receives via the Internet a CurrentPage value from the remote interrogation processing system via the Internet. Then, in a step 694, the Applet returns to the step 650, displays an Applet banner for the revolution corresponding to the CurrentPage value, and the process continues.

If the CurrentPage value is 2 in the step 670, then the Applet proceeds to the step 696. A CurrentPage value of 2 indicates that the third revolution is being displayed, and that the user has indicated that he or she wants to submit another question. In that case, in the step 696 the Applet sets the CurrentPage value equal to 0. Then, in the step 694, the Applet returns to the step 650, displays an Applet banner for the revolution corresponding to the CurrentPage value, and the process continues.

Figure 7:
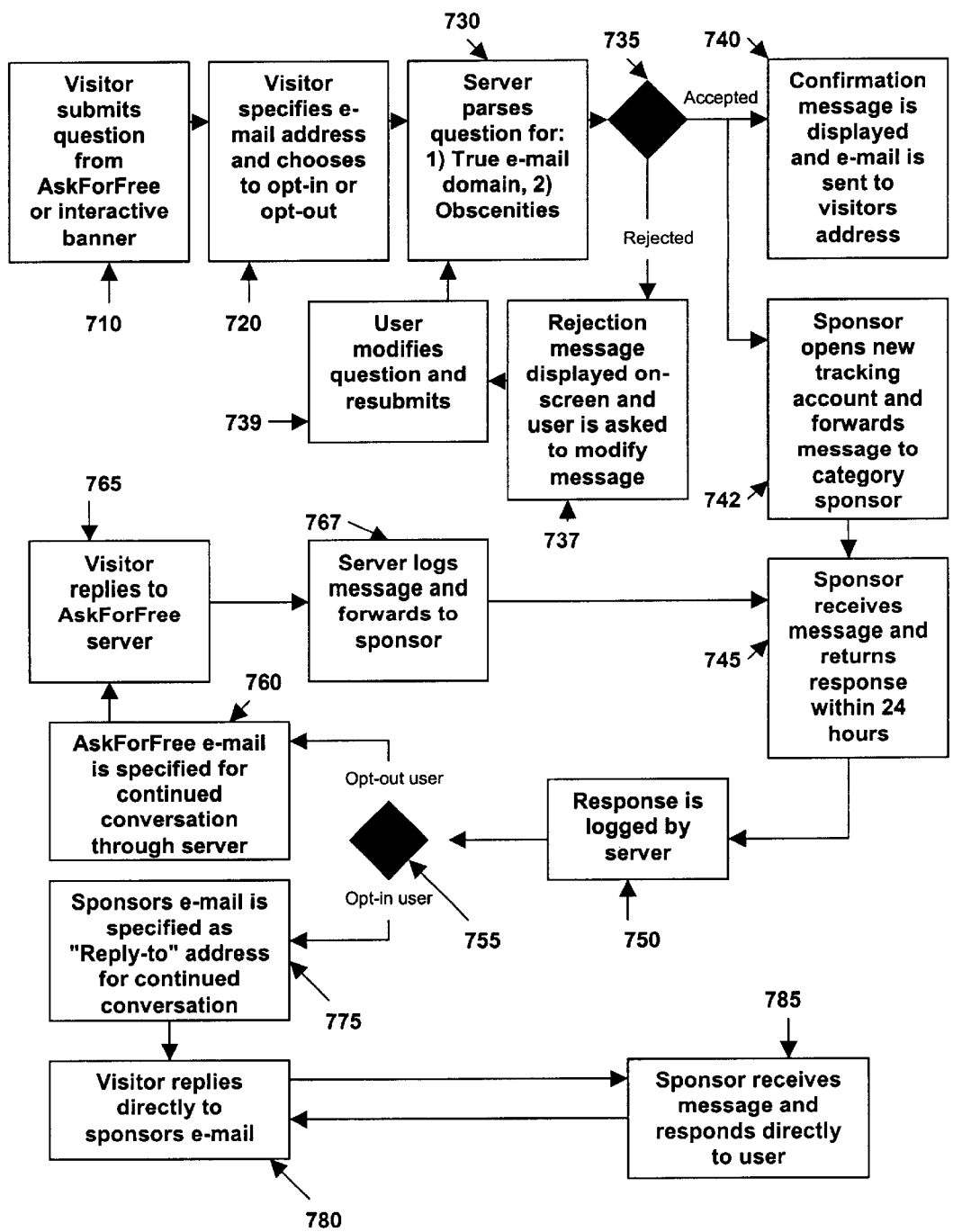
FIG. 7 is a flowchart of a method for processing a question received from an Internet user via the Internet.

FIG. 7 is a flowchart of a method for processing a question received from an Internet user via the Internet.

In a first step 710, an Internet user submits a question via the user's computer. Preferably, the user enters the question via an evolving interactive dialog box through a process such as the process 400 described with respect to FIG. 4, and at the same time selects a category to which the question pertains. Preferably, the list of categories is determined by the provider of the host Web page.

Alternatively, the user may enter and submit the question and select a category through a dialog box appearing on a home Web page of a Web site of the remote interrogation processing system. The question and selected category information is communicated, preferably over the Internet, to the remote interrogation processing system.

In a step 720, an Internet user specifies a destination e-mail address where the user desires to receive a response to his or her question, and makes an Opt-in/Opt-out selection. Preferably, the user enters the destination e-mail address and indicates the Opt-in/Opt-out selection via an evolving interactive dialog box. Alternatively, the user may enter the destination e-mail address and the Opt-in/Opt-out selection through a normal dialog box appearing on a home Web page of a company hosting or providing the interrogation answering service. The destination e-mail address and the Opt-in/Opt-out selection is communicated, preferably over the Internet, to a remote interrogation processing system.

In a step 730, a server of a remote interrogation processing system parses the question and the e-mail address it receives from the user computer to screen for any obscenities or other forbidden language, and to verify that the destination e-mail address corresponds to an actual Internet domain.

In a step 735 the remote interrogation processing system determines whether to accept or reject the question.

If the question includes obscenities or other forbidden language or the destination e-mail address is invalid, then the question is rejected and in a step 737, the remote interrogation processing system communicates a message to the user computer that the question has been rejected and asks the user to modify the question and/or destination e-mail address and resubmit the information.

In that case, in a step 739, the user modifies the question and/or destination e-mail address and resubmits the modified information to the remote interrogation processing system. Then the process returns to the step 730 above.

If the question is accepted in the step 735, then in a step 740, the remote interrogation processing system communicates a confirmation message to the user's computer and, optionally, sends a confirmation e-mail message to the destination e-mail address specified by the user in the step 720.

Next, in a step 742, the remote interrogation processing system opens a new tracking account for the user's question in a question database, and forwards the question to a sponsor corresponding to the category selected by the user in the step 710. Preferably the tracking information includes the question, the corresponding sponsor, the time that the question was submitted, the destination e-mail address for the user who submitted the question, an Opt-in/Opt-out flag, and other appropriate information. Preferably the question is forwarded via the Internet to an e-mail address specified by the sponsor for receiving questions pertaining to one or more sponsored categories. However, other forms of communication via the Internet are contemplated.

In a next step 745, the sponsor receives the question and returns a response to the remote interrogation processing system within a fixed time period, preferably 24 hours.

In a step 750, the response from the sponsor is logged in the corresponding tracking account for the question in question database of the remote interrogation processing system.

In a step 755, the question database is searched to determine whether the user had selected the Opt-in or the Opt-out option with respect to the user's question.

If it is determined that the user had opted out, then in a step 760, the remote interrogation processing system transmits the response via an e-mail message to the user computer and specifies an e-mail address of the remote interrogation processing system as the "Reply-to" address in the e-mail message.

In that case, if the user has any replies or follow-up inquiries, in a step 765 he or she transmits them to the specified e-mail address of the remote interrogation processing system. Then in a step 767, the remote interrogation processing system logs the message or question in a tracking account in the question database and forwards the message or question to the corresponding sponsor. The process then continues at the step 745.

However, if it is determined in the step 755 that the user had opted in, then in a step 775, the remote interrogation processing system transmits the response via an e-mail message to the user computer and specifies the sponsor's e-mail address as the "Reply-to" address in the e-mail message.

In that case, if the user has any replies or follow-up inquiries, in a step 780 he or she transmits them directly to the specified e-mail address for the sponsor. As shown in the step 785, all future responses by the sponsor are communicated directly to the user.

While preferred embodiments are disclosed herein, many variations are possible which remain within the concept and scope of the invention. For example, in the method for processing a question received from an Internet user via the Internet, the interrogation processing system may set an alarm when it receives a question from a user. In that case, interrogation processing system may send a prompt to the selected sponsor if it has not received a reply to the question from the sponsor within a predetermined time interval. Such variations would become clear to one of ordinary skill in the art after inspection of the specification, drawings and claims herein. The invention therefore is not to be restricted except within the spirit and scope of the appended claims.

What is claimed is:

1. A method of receiving user data at a user computer, comprising;
   communicating to the user computer via the Internet a Web page, the Web page displaying a first dialog box;
   displaying the Web page at the user computer, including the first dialog box;
   receiving first user data entered into the first dialog box displayed at the user computer;
   indicating that the first user data has been completely entered into the first dialog box displayed at the user computer; and
   replacing the first dialog box with a second dialog box while display of a remainder of the Web page at the user computer is not changed.

2. The method of claim 1, further comprising communicating the user data to an interrogation processing system.

3. The method of claim 1, further comprising:
   receiving second user data entered into the second dialog box displayed by the user computer;
   indicating that the second user data has been completely entered into the second dialog box displayed at the user computer; and
   replacing the second dialog box with a third dialog box while display of a remainder of the Web page at the user computer is not changed.

4. The method of claim 3, further comprising:
   indicating a request to enter additional user data; and
   replacing the third dialog box with the first dialog box while display of a remainder of the Web page at the user computer is not changed.

5. A method of processing a question, comprising:
   communicating via the Internet to a user computer a Web page, the Web page displaying a first dialog box;
   displaying the Web page including the first dialog box at the user computer;
   receiving the question entered into the first dialog box displayed at the user computer;
   replacing the first dialog box with a second dialog box such that the user computer displays the second dialog box while display of a remainder of the Web page at the user computer is not changed;
   receiving a destination for receiving an answer to the question, the destination entered into the second dialog box displayed at the user computer; and
   communicating the question and the destination via the Internet to an interrogation processing system.

6. The method of processing a question of claim 5, further comprising replacing the second dialog box with a third dialog box while display of a remainder of the Web page at the user computer is not changed.

7. The method of processing a question of claim 6, wherein the third dialog box indicates a confirmation that the question has been received by the interrogation processing system.

8. The method of processing a question of claim 6, further comprising communicating the question from the interrogation processing system to a selected sponsor via the Internet.

9. The method of processing a question of claim 8, further comprising communicating an answer for the question to the user computer.

10. The method of processing a question of claim 9, further comprising communicating the answer from interrogation processing system to the user computer.

11. The method of processing a question of claim 10, further comprising receiving the answer from the selected sponsor to the interrogation processing system prior to communicating the answer from interrogation processing system to the user computer.

12. The method of processing a question of claim 8, further comprising providing in the second dialog box a hyperlink for the selected sponsor Web site.

13. A method of communicating user data from a user computer to a selected sponsor, comprising:

providing a Web page to the user computer including a data entry box for receiving the user data;

receiving the user data entered into the data entry box of the Web;

communicating the user data via the Internet to an information processing system;

determining the selected sponsor based at least in part upon the user data;

forwarding the user data from the information processing system to the selected sponsor; and replacing the data enter box with another data box while display of a remainder of the Web page at the user computer is not changed.

14. The method of claim 13, wherein the user data comprises a question and a question category and wherein the selected sponsor is selected corresponding to the question category.

15. The method of claim 14, wherein the user data further comprises a destination address for the user computer where an answer to the question should be delivered.

16. The method of claim 13, wherein the user data is forwarded from the information processing system to the selected sponsor via the Internet.

17. The method of claim 16, wherein the user data comprises a destination address for the user computer.

18. A computer-implemented system for processing a question, the system comprising:

a user computer displaying a Web page which includes a dialog box for entering the question, wherein the Web page is not changed when the dialog box is changed;

an interrogation processing system connected to the user computer via a computer network; and a plurality of sponsors connected with the user computer and the interrogation processing system by the computer network, each of said sponsors being associated with one or more categories of questions, wherein the interrogation processing system receives the question from the user computer and forwards the question to a selected one of the plurality of sponsors.

19. The system of claim 18, wherein the interrogation processing system further receives a question category from the user computer and selects the selected one of the plurality of sponsors based upon the question category.

* * * * *